United States Patent [19]

Flasck

[11] 4,170,728
[45] Oct. 9, 1979

[54] HEAT APPLYING MICROFILM RECORDING APPARATUS

[75] Inventor: Richard Flasck, Rochester, Mich.

[73] Assignee: Energy Conversion Devices, Inc., Troy, Mich.

[21] Appl. No.: 871,435

[22] Filed: Jan. 23, 1978

[51] Int. Cl.² .............................................. H05B 1/00
[52] U.S. Cl. ................................. 219/216; 346/76 R
[58] Field of Search ............... 219/216, 543; 346/76 R

[56] References Cited

U.S. PATENT DOCUMENTS

| | | | |
|---|---|---|---|
| 3,161,457 | 12/1964 | Schroeder et al. | 346/76 |
| 3,327,314 | 6/1967 | Zeuthen | 346/76 |
| 3,478,191 | 11/1969 | Johnson et al. | 219/543 X |
| 3,578,946 | 5/1971 | Colello | 219/543 |
| 3,777,116 | 12/1973 | Brescig et al. | 219/216 |
| 3,862,394 | 1/1975 | Lane | 219/216 |
| 3,966,317 | 6/1976 | Wacks et al. | 355/19 |

Primary Examiner—C. L. Albritton
Attorney, Agent, or Firm—Wallenstein, Spangenberg, Hattis & Strampel

[57] ABSTRACT

A heat-applying recording head to image selected microsize points of a heat imageable recording material comprises a heating wire support body having a thin recording material facing end with longitudinally closed spaced, transversely extending notches therein which form wire-positioning recesses which terminate in respective aligned edges to face the recording material. Fine threads of heating wire material extend in said notches and respectively bend around the aligned edges to extend along opposite faces of the support body. The threads of heating wire are substantially thicker than the depth of the notches so as to project substantially beyond the support body. The heating wire-forming threads along at least one of the faces of the support body to diverge progressively in a direction away from the recording material facing end of the support body and extend to relatively widely spaced current feeding terminal points. The threads of heating wire material at points near the points where they bend around the aligned support body edges are enveloped and electrically shunted by a low resistance material. The recording material facing end of the support body with the fine threads of heating wire material supported thereon are encapsulated in a body of heat sink-forming material which extends contiguous to but is spaced from the portions of said support body where the threads of heating wire material bend around the aligned edges thereof.

22 Claims, 26 Drawing Figures

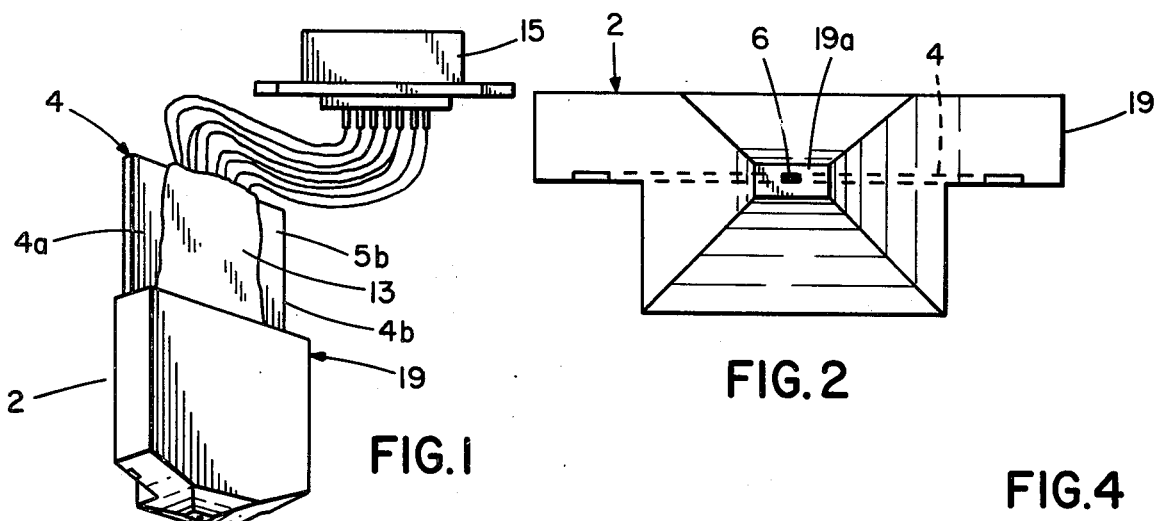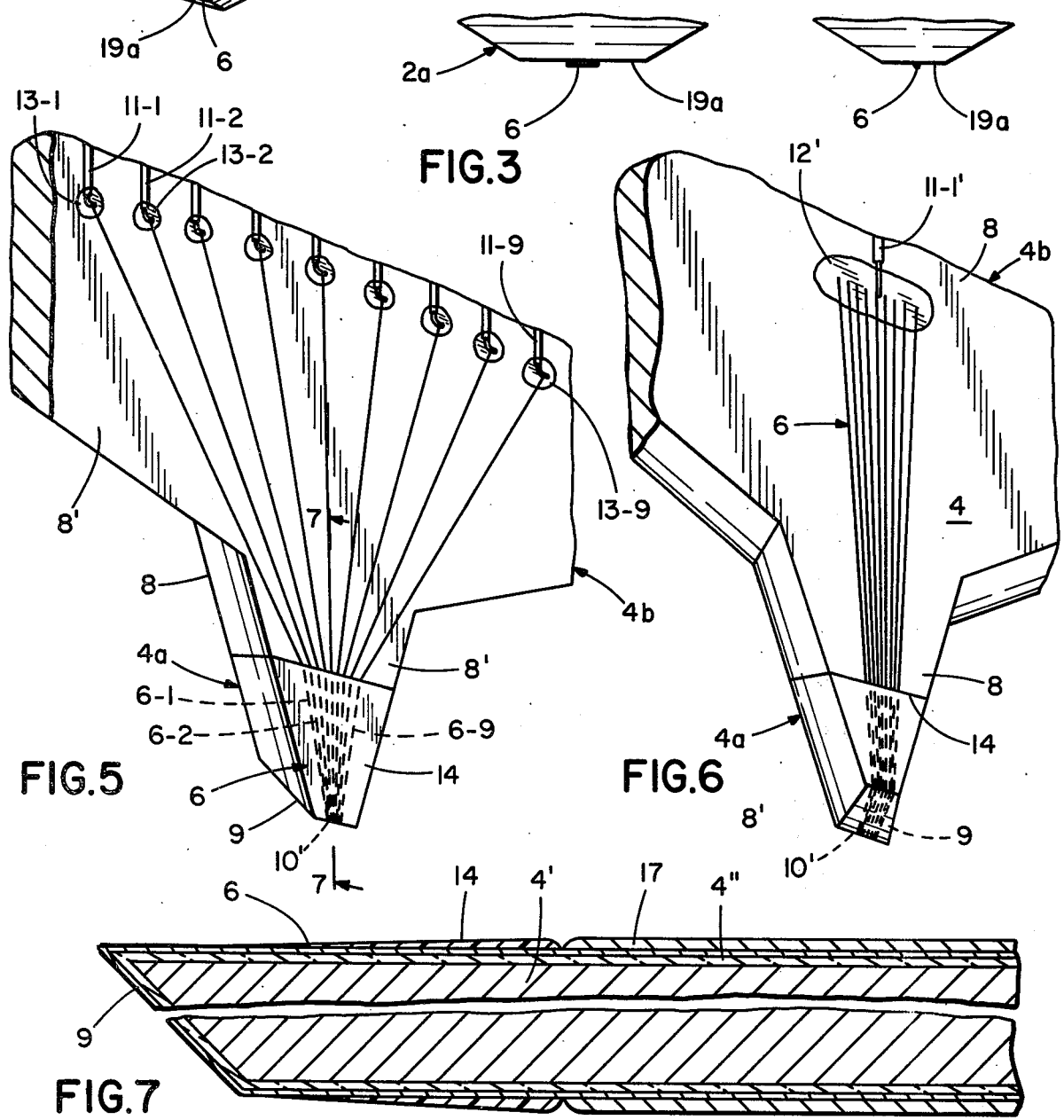

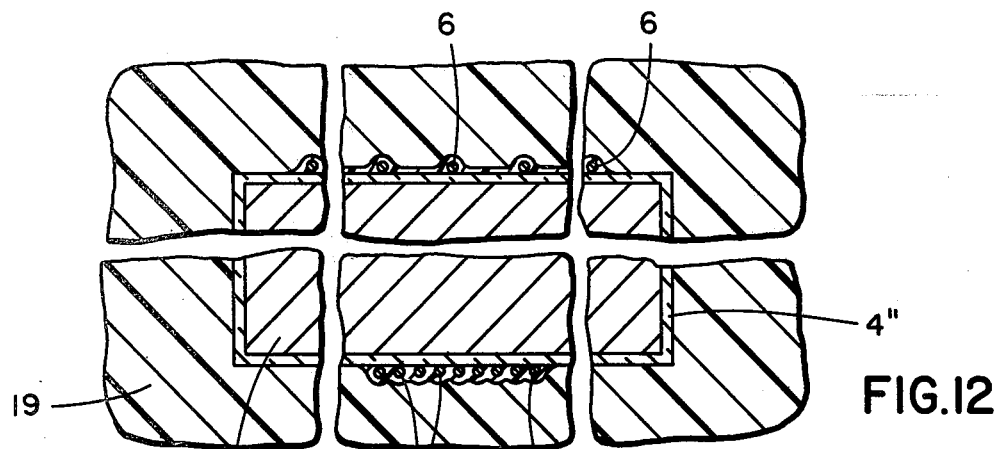
FIG.12
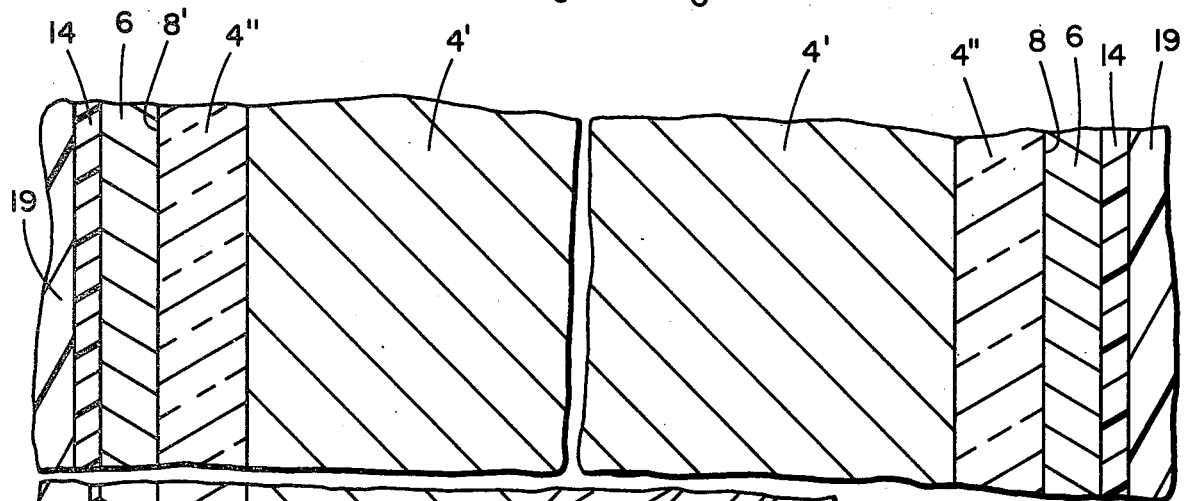
FIG.14
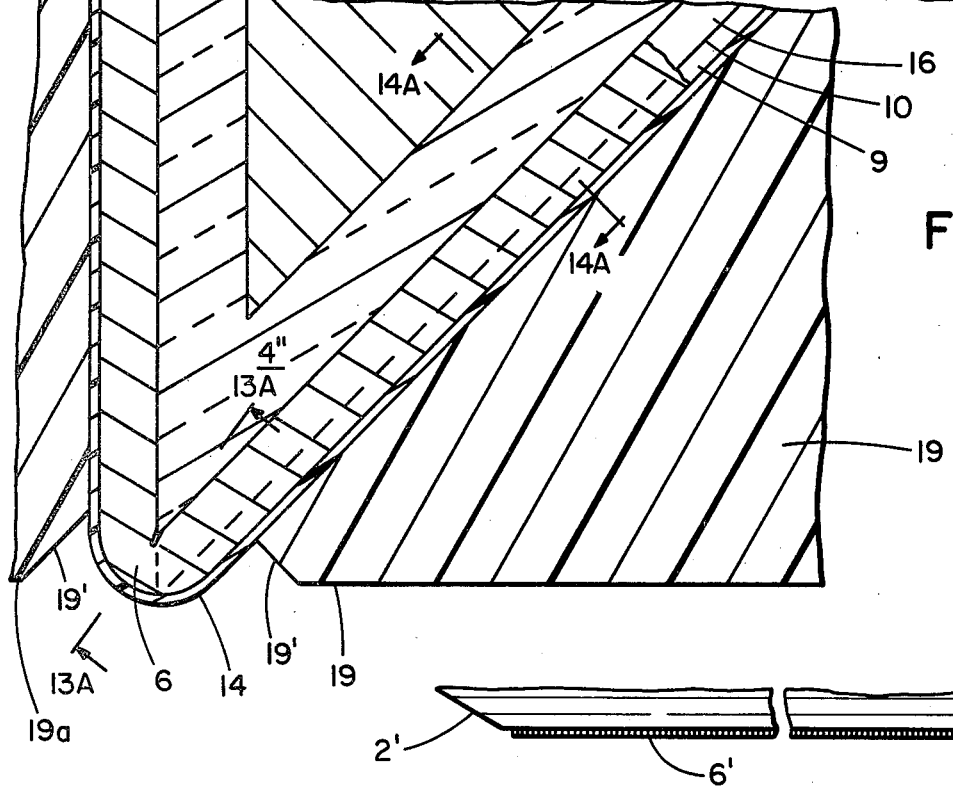
FIG.13
FIG.18

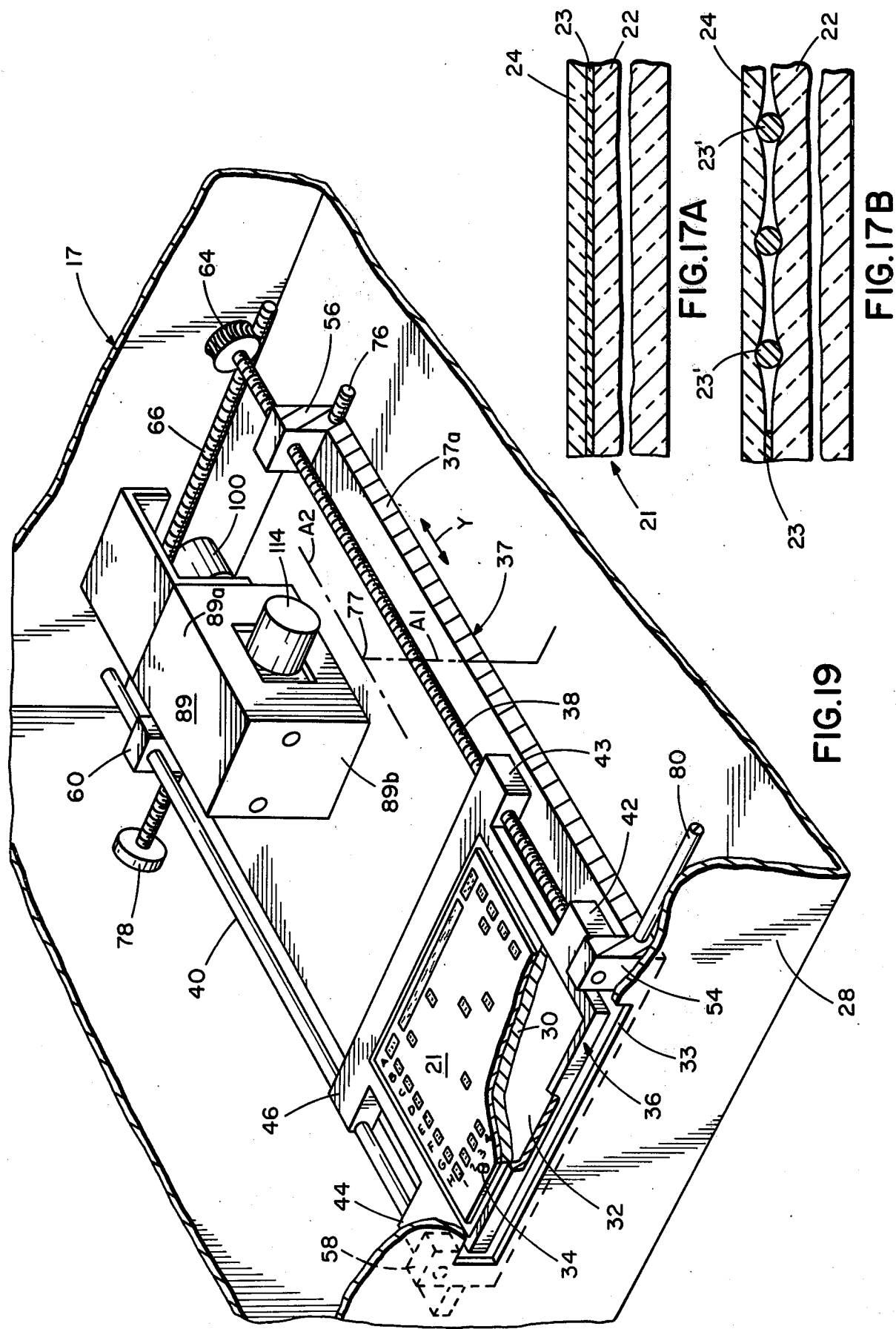

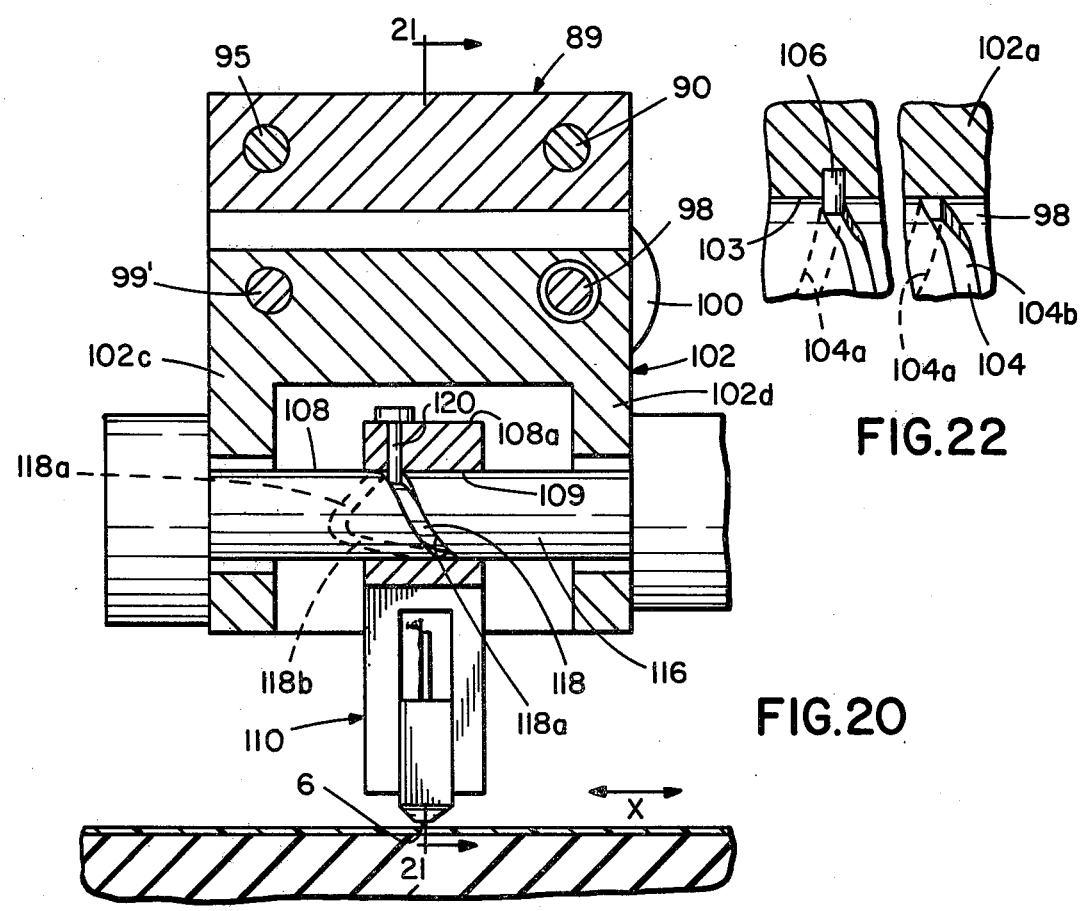
FIG. 22
FIG. 20
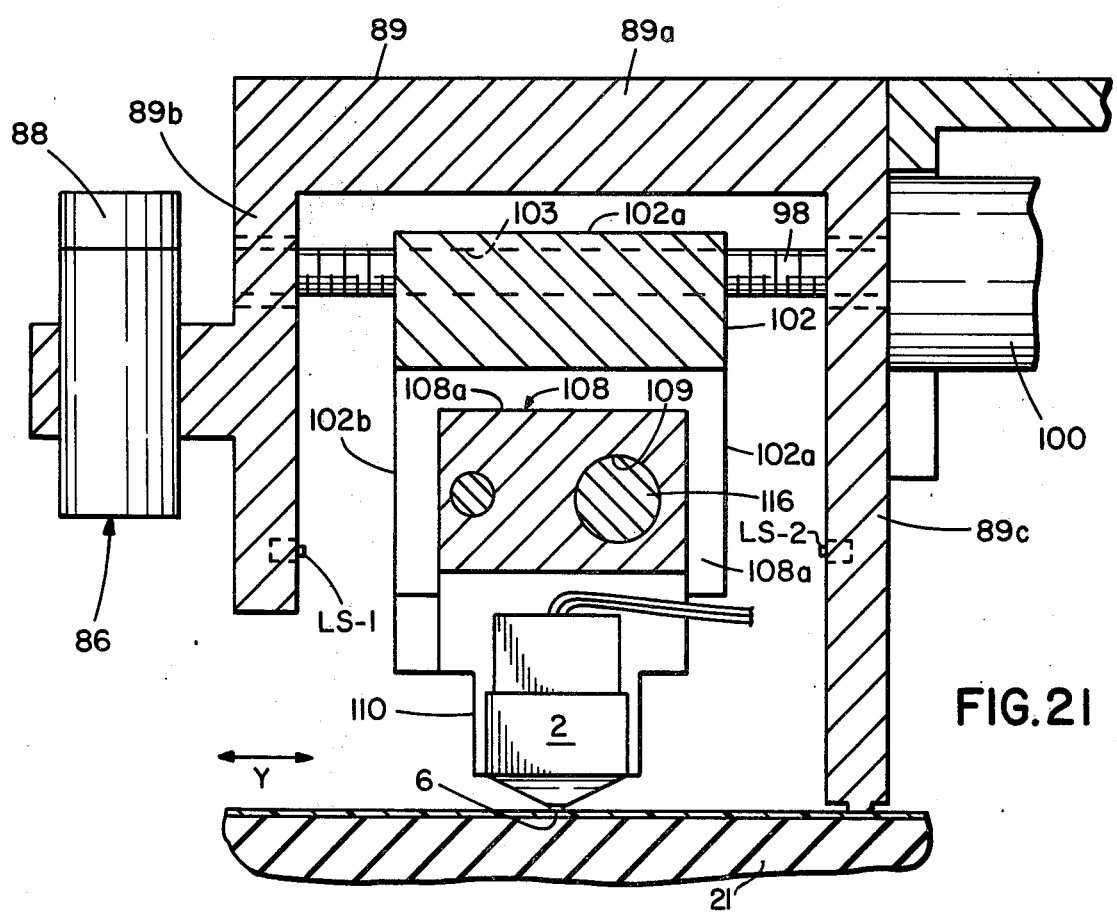
FIG. 21

HEAT APPLYING MICROFILM RECORDING APPARATUS

BACKGROUND OF THE INVENTION

This invention relates to apparatus for producing microform records of alpha-numeric, pictorial or digitally coded information.

Microfilm records of documents have, heretofore, been commercially produced by exposing conventional silver halide film, requiring processing with liquid chemicals, with greatly reduced images of the documents involved. Because the processing of the film requires skilled personnel who can handle the processing chemicals and equipment involved, microfilm processing equipment has not been a standard piece of office equipment, like the Xerox-type document copying machines found in most offices today.

Relatively recently, there has been developed films which are imaged solely by application of heat and/or light, making feasible the design of useful microfilm recording equipment operable to make microfilm records directly from hard copy by unskilled office personnel. Such dry process microfilm recording equipment is disclosed in U.S. Pat. No. 3,966,317, granted June 29, 1976. However, there has been a substantial need to produce alpha-numeric and pictorial microfilm records directly from electrical signals generated by a typewriter keyboard or outputed from computers or the like. While it has been proposed to make microfilm records of alpha-numeric or pictorial data directly from electrical signals generated by computers, such equipment has required the use of laser beam film scanning equipment, which is very expensive and wasteful of energy. For example, the cost of such equipment heretofore quoted has been well in excess of $100,000 per machine. Also, OSHA regulations prevent their use in most offices.

In co-pending application Ser. No. 724,084, filed Sept. 16, 1976, a data storage and retrieval system is disclosed which produces directly from a typewriter keyboard or computer output micro-sized, alpha-numeric or pictorial producing, dot image patterns on a dry process dispersion type film, like that disclosed in U.S. Pat. No. 3,966,317. The data storage and retrieval system disclosed in this application utilizes a recording head including micro-sized current-carrying points for Joule heating micro-sized points on such a film which produces similarly sized dot images from the heat applied thereto. The recording heads disclosed in this application, which were developed by me, have unbelievably small, current-carrying, heat-producing points each having dimensions preferably no greater than about 12 micron and, less desirably, no greater than about 20 micron, to produce similarly sized dot images on the recording film. Adjacent portions of these heat-producing points of the recording heads are preferably spaced apart a distance much less than the size thereof so that adjacent dot images can appear almost merged into a continuous image without the need of current pulse profiles causing substantial spreading of the heat and consequent greater cooling times.

The current-carrying, heat-producing points on the recording head are preferably aligned in a single row, and selected ones of these current-carrying points are fed with bursts of short pulses of current as the recording head scans the film, to form the desired pattern of dot images in the film, duplicating the data represented by the current pulses fed to the current-carrying points of the recording heads. The recording heads disclosed in this application, which have current-carrying points formed by fine threads of heating wire material like chromel or nichrome or threads of deposited resistance material, are mounted on a support structure which rapidly causes the threads of heating wire material to scan the film area set aside for a page of data to be recorded thereon at a given moment. While the recording heads disclosed in the drawings of this application have less than 10 such aligned current-carrying points, by providing a recording head with a vertical row of current-carrying heat-producing points thereon equal to the number of dot images-receiving spaces in the entire vertical extent of this area, a full page of data can be recorded in only a single sweep of the area by the recording head involved. During each sweep of the recording head across this area of the film, the various current-carrying heat-producing points of the recording head will be fed with large numbers of current pulses. The permissible scanning speed of such a recording head depends to a great extent on the time it takes each current-carrying, heat-producing point thereof to cool sufficiently following the termination of a current pulse therein that the temperature of the point involved will not create another image on the film until the next current pulse is fed thereto.

Prior to the invention disclosed in application Ser. No. 724,084 it was not thought feasible to produce micro-sized dot images on heat responsive films by Joule heating the same from current-carrying wires or threads of deposited resistance material.

An object of the present invention is to provide a heat-producing recording head capable of producing clearly defined, extremely closely spaced micro-sized, projectible dot images on a heat-responsive film, so that microfilm records can be produced thereby, and the information so recorded can be projected onto a screen by conventional microfilm reading equipment in a manner where the information can be easily read.

Another object of the invention is to provide a recording head having micro-sized, current-carrying, heat-producing points thereon capable of producing micro-sized dot images on a heat-responsive film, and wherein the recording head is constructed to minimize the cooling time of the current-carrying heat-producing points thereof, upon termination of a current pulse fed thereto.

A further object of the invention is to provide apparatus for forming dot images on heat-imageable film with a recording head which makes sliding engagement with the surface of the film in the process of sweeping the same, and wherein any serious scratching of the film is avoided.

A still further object of the invention is to provide a recording head as described, and which is so constructed that it can be manufactured at a reasonable cost. A related object of the invention is to provide a recording head as described which has a relatively long life expectancy.

SUMMARY OF THE INVENTION

Thus, in accordance with the invention, a heat-producing recording head is provided for directly forming micro-sized and spaced dot images and which can be manufactured at a reasonable cost and have a reasonably good life expectancy. The dot images formed thereby produce at least a 24 to 1 size reduction of ordinary sized type characters to form commercial microfilm records of letters and other documents. In accordance with one of the features of the invention, the recording head includes a support body carrying micro-sized and spaced threads of heating wire material, each precisely positioned in recesses or notches preferably centered on points spaced apart no more than about 1½ times the thread diameter, and preferably less than 1¼ times the thread diameter. The recesses or notches extend transversely across the microfilm facing end of the support body most advantageously made of a heat sinking material having an insulating surface, like anodized aluminum or alumina. Each thread is bent back around an edge formed in the end of the recess or notch, to present a micro-sized heat application point to be applied to the microfilm. The fine threads of heating wire material, preferably on an unnotched face of the support body, diverge sharply outwardly with respect to one another in a direction away from the microfilm facing end of the support body, where they extend to relatively widely spaced terminal points on the support body. Much larger conductors preferably connect with the heating wire-forming threads at these terminal points. The threads of heating wire material on the other face of the support body may be connected to a common terminal point to which a much larger conductor is connected extending to a common current input terminal for the recording head. Means are provided for moving either the recording head or microfilm relative to the other (preferably the recording head is moved), and various patterns of current pulses are fed to the fine threads of heating wire material as the recording head occupies various positions along the microfilm, to record the desired information thereon.

In accordance with another feature of the invention, to increase the efficiency and relative speed with which the data recording process may be carried out with the recording head of the invention, the threads of heating wire material are heated only at the portions thereof that are at and contiguous to the points where the threads of heating wire material are bent back around the edges in the recesses or notches at the microfilm facing end of the support body, and this end of the support body is encapsulated in a body of heat sinking material up to points close to but slightly spaced from the bent back portions of the threads of heating wire material. The heat sinking qualities of the support body and the surrounding encapsulating body of heat sinking material together operate quickly to cool the exposed bent back portions of the threads of heating wire material after termination of current pulses fed thereto. However, so that the heat sinking characteristics of the support body and encapsulating body do not adversely affect the transmission of substantial heat to the microfilm to form sharply defined dot images, the bent back portions of the threads of heating wire material project beyond the support body and are slightly spaced from the encapsulating body. Also, the encapsulating body may be formed with a flat film-engaging surface which prevent excessive bowing of the microfilm, to maintain even contact of the heating wire-forming threads with the microfilm.

The selective heating of only portions of the threads of heating wire material is most advantageously achieved by selectively applying, as by electroplating, coatings of copper or other highly conductive material over the heating wire-forming threads at points thereof sufficiently spaced from the bent back portions thereof that the diverging portions thereof are substantially spaced apart along the side of the support body. The heated portions of the threads of heating wire material may be masked from the electroplating solution, at least in part, by a thin layer of non-conductive cement, which permanently anchors the threads to the support body, and/or by a temporarily applied body of removable masking material applied to the heated portions thereof. (While the recording head of U.S. Pat. No. 3,862,394 shows the enclosure of heating wires with copper up to a point where they are to be heated, the recording head construction there disclosed is quite different from the recording head just described, which provides micro-sized and spaced threads of heating wire material, grooves or notches to precisely position and separate the same and an encapsulating body for better heat sinking and microfilm position stabilization.)

In accordance with another feature of the invention, the support body edges around which the threads of head resistance material are bent most advantageously are defined by surfaces meeting at an acute angle no greater than about 45°. The sharply bent back threads are crimped at the crotches of the bends therein, to reduce the thickness of the threads thereat, which increases the resistance of the threads to concentrate the heat at the points where the heating wire-forming threads make contact with the microfilm.

In accordance with still another feature of the invention, the scratching of the microfilm as the projecting threads of heating wire material slide thereover is avoided or minimized to a degree where scratches do not appear in a projected microfilm image by supporting the microfilm against a resilient backing which is sufficiently yieldable to avoid serious scratching of the film but sufficiently rigid to avoid undue bowing of the film which would cause poor, uneven contact between the heating wire-forming threads and the microfilm. For example, a pad of polyurethane foam material of a given desired degree of softness avoids completely any significant scratching of the film and does not adversely affect the even sharpness of the dot images produced by the recording head.

The above described and other features and advantages of the invention will become apparent upon making reference to the specification to follow, the claims and the drawings.

DESCRIPTION OF DRAWINGS

FIG. 1 is a perspective view of a heat-producing recording head constituting the most preferred form of the invention, the scale thereof being approximately 1½ times the size of an actual working model thereof;

FIG. 2 is an enlarged bottom view of the recording head shown in FIG. 1;

FIG. 3 is an enlarged fragmentary, side elevational view of the film-contact bottom end of the recording head of FIG. 1;

FIG. 4 is an enlarged, fragmentary, and elevational view of the film-contacting bottom end of the recording head shown in FIG. 1;

FIG. 5 is a fragmentary, greatly enlarged, perspective view of the heating wire support body portion of the recording head shown in FIG. 1, separated from the encapsulating outer body of insulating material shown in FIG. 1;

FIG. 6 is a fragmentary view of the portion of the support body shown in FIG. 5, as seen from the opposite side thereof;

FIG. 7 is an enlarged longitudinal sectional view through the support body shown in FIG. 5, taken along section line 7—7 therein;

FIG. 12 is a horizontal sectional view through the entire recording head shown in FIG. 1, as seen in a section plane passing through the portion of the projecting neck portion identified in FIG. 5 by section line 7—7;

FIG. 13 is a greatly enlarged fragmentary sectional view through the bottom end portion of the entire recording head shown in FIG. 1, as would be seen in a vertical section plane identified in FIG. 5 by section line 7—7;

FIG. 14 is a greatly enlarged fragmentary sectional view through the bottom end portion of the entire recording head shown in FIG. 1, as would be seen in a vertical section plane identified in FIG. 5 by section line 7—7, but at a point somewhat higher than that visible in FIG. 13;

FIGS. 17A and 17B are greatly magnified fragmentary sectional views through a preferred microfilm structure which is particularly suitable for imaging by the recording head of the invention and showing respectively the structure of this layer before and after heat above a critical value is applied thereto;

FIG. 18 is a greatly enlarged, fractional view of the bottom portion of a recording head constituting a modification of the recording head of FIG. 1 in that a much greater number of heating wire-forming threads project from the bottom thereof to encompass the entire vertical extent of a frame on a micro-fiche card so that the entire frame is scanned as the recording head is moved the full width of the frame;

FIG. 19 is a perspective, broken-away view of a recording head and microfilm support structure for respectively supporting the recording head and microfilm shown in FIG. 16;

FIG. 20 is an enlarged fragmentary vertical sectional view through the lens and recording head carrying unit shown in FIG. 19, and shows the manner in which the recording head is reciprocated in the X axis direction;

FIG. 21 is a sectional view taken along section line 21—21 of FIG. 20 and illustrates the manner in which the heating head is reciprocated along the Y axis; and FIG. 22 is a greatly magnified fragmentary sectional view through parts of the recording head-carrying unit and shows details of a screw and recording head-carrying frame to illustrate the manner in which rotation of the screw reciprocates the recording head-carrying frame.

DESCRIPTION OF EXEMPLARY FORM OF THE INVENTION

Refer now more particularly to FIGS. 1 through 11 which show views of a heat applying recording head 2 constructed in accordance with the most preferred form of the invention. As there shown, the recording head includes a heating wire support body 4 upon which fine threads 6 of heating wire material (like chromel) are supported on the bottom microfilm-facing end thereof in a manner where they project slightly downwardly beyond the exposed bottom end of a projecting neck portion 4a of the support body, to make good contact with the microfilm to be imaged thereby. The support body is most advantageously made of a good heat sinking material, like alumina or anodized aluminum, which presents an insulating body surface over which fine threads 6 of heating wire material may be placed without short-circuiting the same. (Heating wire-forming threads 6, for example, having a diameter of about 12.5 micron, were used successfully in building a working model of the recording head shown in FIG. 1.) In a manner to be described, the threads 6 are permanently precisely positioned along the bottom end of the projecting neck portion 4a where they are spaced apart at their centers no more than about $1\frac{1}{2}$ times their diameter, and preferably less than about $1\frac{1}{2}$ times their diameter.

Figure 8:
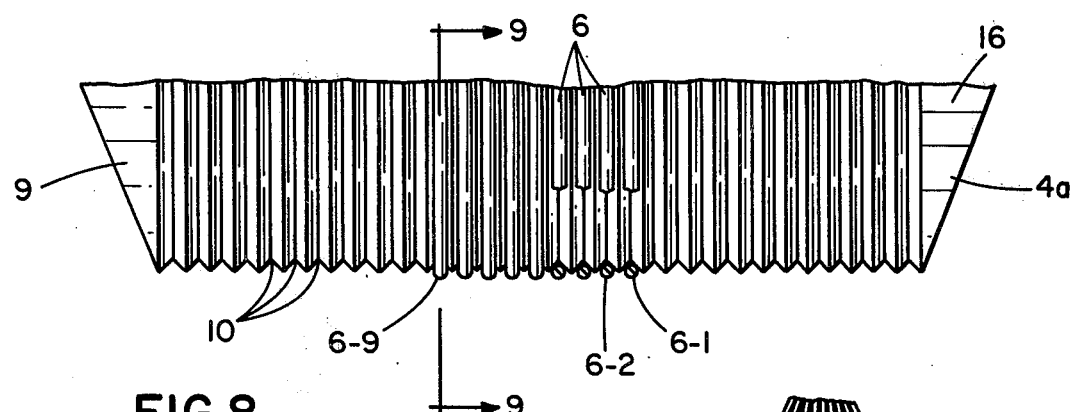
FIG. 8 is a greatly enlarged fragmentary side elevational view, partly broken away, of the bottom film-facing end of the support body before a conductive cement is applied thereto.

The support body 4, most advantageously, is a relatively thin plate having a main rectangular portion 4b from the bottom of which the neck portion 4a thereof projects. As illustrated, the neck portion 4a preferably has a vertical side face 8 which may be co-planar with the side face 8 of the main portion 4b, to simplify the fabrication of the support body, and an opposite vertical side face 8' parallel thereto and co-planar with the side face 8' of the main portion 4b. The side face 8 of the neck portion 4a terminates in an inclined face 9 intersecting the side face 8' at a small acute angle preferably no greater than about 45°, to provide a sharply pointed neck profile. The inclined face 9 is provided with thread positioning recesses or notches 10 which may be formed by a conventional ruling machine whose cutting edges are moved parallel to the inclined face 9 to form the V-shaped notches 10 shown in FIG. 8. Each notch 10 terminates at an edge 10' (FIG. 9) where the ruled face 9 intersects the vertical side face 8' of the neck portion 4a. Where the recording head is to form alpha-numeric characters, in the exemplary form of the invention being described a selection of up to seven vertically spaced dot images will form a vertical segment of any such character. Accordingly, at least seven contiguous heating wire-forming threads must be carried on the support body 4. While, as shown in FIG. 8, somewhat more than 30 notches 10 are formed in the end of the projecting neck portion 4a of the support body, only nine contiguous notches preferably centered along the neck portion 4a are shown receiving heating wire-forming threads 6-1, 6-2, . . . 6-9. Nine rather than seven threads are provided to improve the flexibility and reliability of the recording head since any seven contiguous operative threads will form an operating recording head, and so any defects in the operability of the remaining two threads will not effect the ability of the recording head to form the desired dot images involved. The enlarged sectional views of the support body 4 shows it comprising a body 4' of metal like aluminum with about a 25 micron thick anodized oxide layer 4" thereon.

Figure 9:
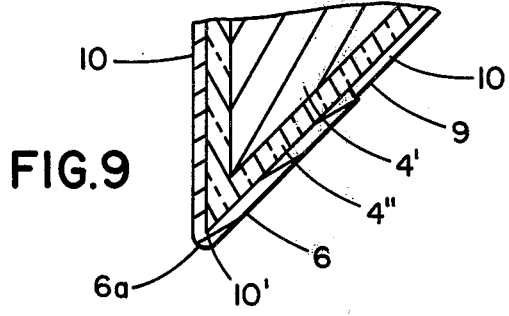
FIG. 9 is a sectional view through the support body shown in FIG. 8, taken along section line 9—9 therein.

As shown, for example, in FIG. 9, each of the heating wire-forming threads 6 extending within a notch 10 is bent back around the edge 10' formed at the end of the notch, and each thread is anchored in a manner so that it is preferably held snugly against the associated edge 10', to deform or crimp the bent-back thread in the crotch or fold thereof, which reduces the cross-sectional area thereat. This increases the resistance and the heat produced at the point of each thread where it projects from the support body 4 for engagement with the microfilm. Also, a precisely defined heat-producing point is produced by the projecting portion of the thread at the sharply bent-back portion thereof.

Figure 11:
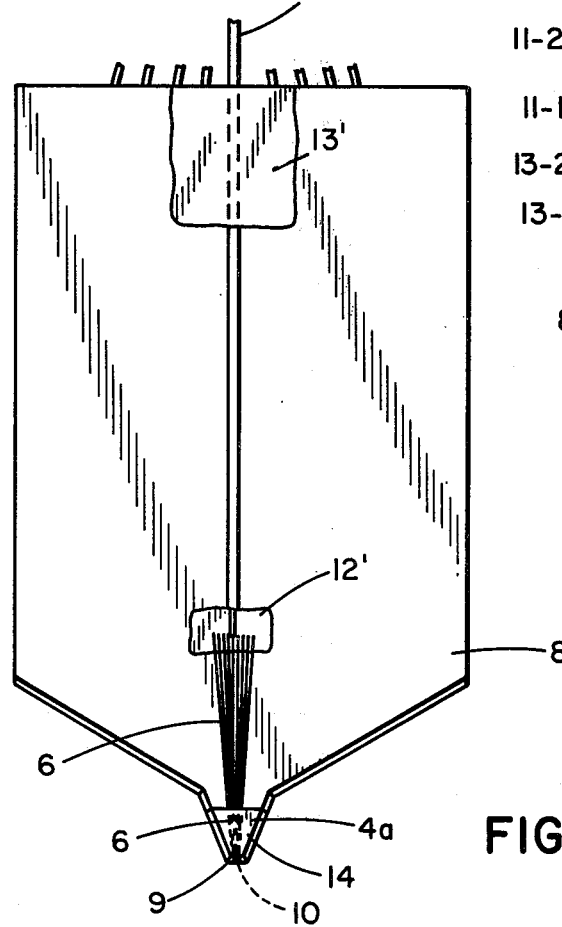
FIG. 11 is a side elevational view drawn to a somewhat smaller scale of the entire heating wire carrying support body, as viewed from the side thereof visible in FIG. 6.

As best shown in FIG. 11, the heating wire-forming threads 6 extend from the respective notches 10 on the inclined ruled face 9 of the neck portion 4a and pass along the smooth vertical side face 8 of the support body where they terminate in a glob 12' of conductive cement applied to the face 8. As illustrated, the glob 12' of conductive cement electrically and physically connects the ends of the heating wire-forming threads to a common insulated copper conductor 11-1'.

The portions of the heating wire-forming threads 6 leaving the edges 10' at the bottom end of the notches 10 extend along the unruled vertical face 8' of the neck portion 4a of the support body 4 where they diverge gradually from one another in a direction away from the edges 10'. They are maintained in spaced relationship by a layer 14 of non-conductive cement applied thereto in a narrow band terminating, as illustrated, about half-way up the neck portion 4a (FIGS. 5-7). This layer 14 of non-conductive cement, which is shown also extending over the threads 6 half-way up the other face 8 of the neck portion 4a, may be applied to the bottom end portion of the neck portion 4a of the support body 4 by dipping the neck portion into a liquid body of such cement while it is still in a highly flowable condition. In such case, as the excess cement partially drains from the neck portion 4a, it may form an extremely thin coating (like 1 micron thick) at the projecting bent-back ends of the heating wire-forming threads 6, and can gradually build up in thickness for example, to 25 micron, at a point approximately one-half up the neck portion 4a.

The heating wire-forming threads 6 are shown diverging sharply at the points where the layer 14 of non-conductive cement terminates, the threads extending to relatively widely spaced terminal points 13-1, 13-2, . . . 13-9 formed by globs of a conductive cement which physically anchors the threads thereat to the face 8 of the main portion 4b of the support body. Insulated copper conductors 11-1, 11-2, . . . 11-9 make electrical connection with the threads 6-1, 6-2, . . . 6-9 and are also anchored to the support body by the respective globs of cement. As best shown in FIG. 5, the initial connection of each of the heating wire-forming threads 6 to a conductor 11 may be by winding the thread around the exposed end of the conductor 11, and then anchoring the same to the surface of the support body 4 by a glob of conductive cement.

Figure 10:
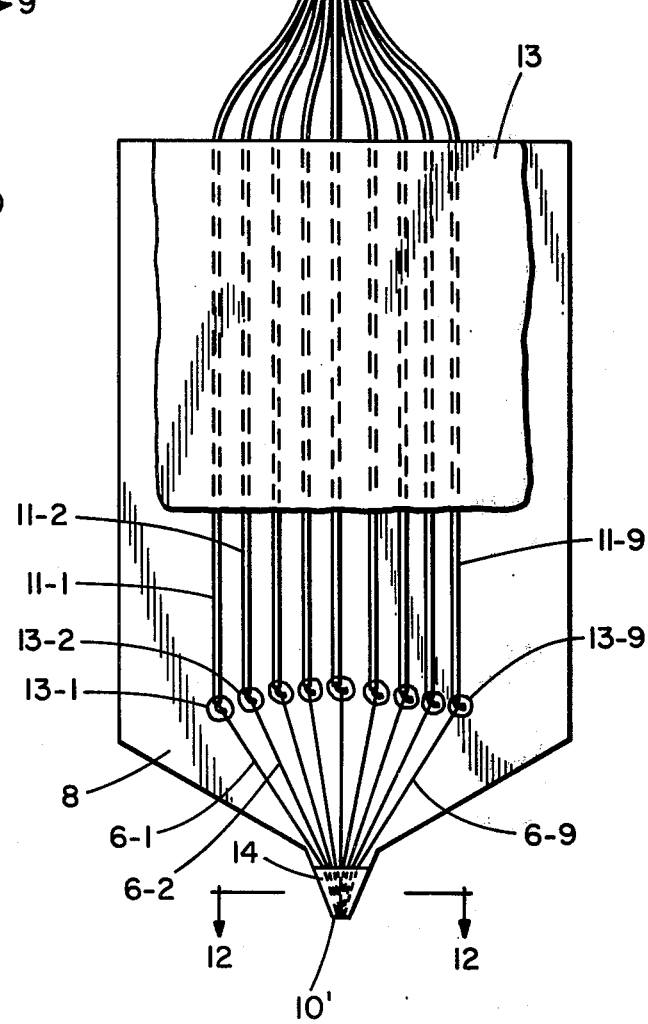
FIG. 10 is a side elevational view drawn to a somewhat smaller scale of the entire heating wire carrying support body, as viewed from the side thereof visible in FIG. 5.

The conductors 11-1, 11-2, . . . 11-9 extending along the vertical face 8' of the support body 4, and the conductor 11-1' extending along the opposite face 8 of the support body may be respectively physically anchored to the support body by bodies 13—13' of cement (see FIGS. 10 and 11). At the upper ends of the support body 4b the conductors 11-1, 11-2, . . . 11-9 and 11-1' may be gathered together to form a common cable where they extend to a male connector 15 (see FIG. 1) which can make electrical connection with a complementary female connector (not shown). Narrow pulses of current are fed selectively to the terminals of this female connector at a given instant of time, selectively to energize the heating wire-forming threads 6 which are to form dot images at the particular points of the microfilm over which the threads are positioned at a given instant of time.

As can be seen from the drawings, the length of the projecting neck portion 4b of the support body 4 is only a fraction of the total length of the heating wire-forming threads 6. In order to efficiently use the current applied to the recording head and to avoid unnecessarily heating extensive portions of the threads 6 which do not perform any microfilm heating function, after application of the non-conductive cement 14 to the bottom end of the neck portion 4a of the support body 4, the then still exposed portions of the threads extending to the conductive globs of cement are electroplated with copper layers 17 or other suitable conductive material preferably to a substantial thickness, for example, like 25 micron, so that practically no current flows through these plated portions of the threads 6.

Figure 13A:
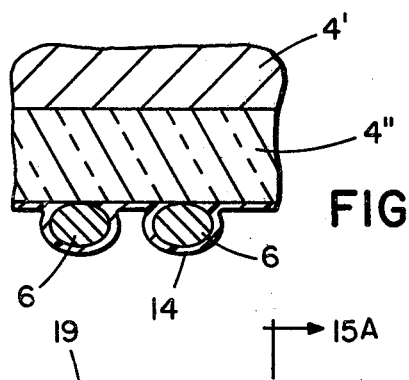
FIG. 13A is a transverse sectional view through the recording head seen in FIG. 13, taken along section line 13A—13A therein.
Figure 14A:
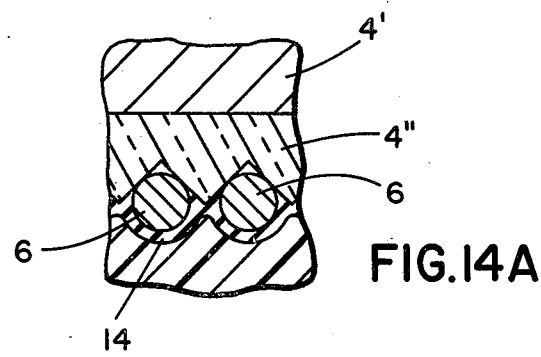
FIG. 14A is a sectional view through that portion of the recording head shown in FIG. 14, as seen along section line 14A—14A therein.
Figure 15:
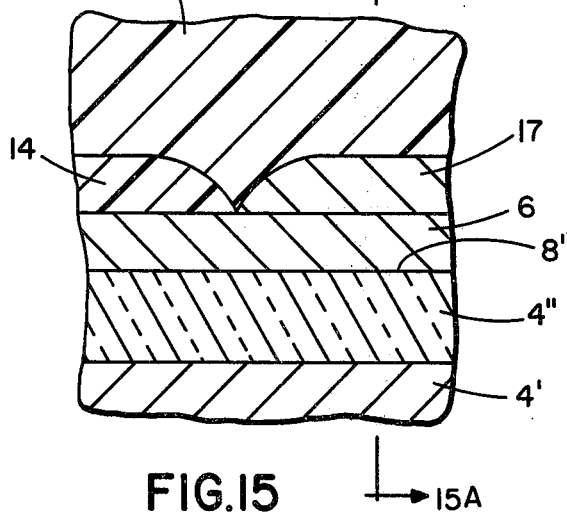
FIG. 15 is a greatly enlarged fragmentary sectional view through the bottom end portion of the entire recording head shown in FIG. 1, as would be seen in a vertical section plane identified in FIG. 5 by section line 7—7, but at a point somewhat higher than that visible in FIG. 14.
Figure 15A:
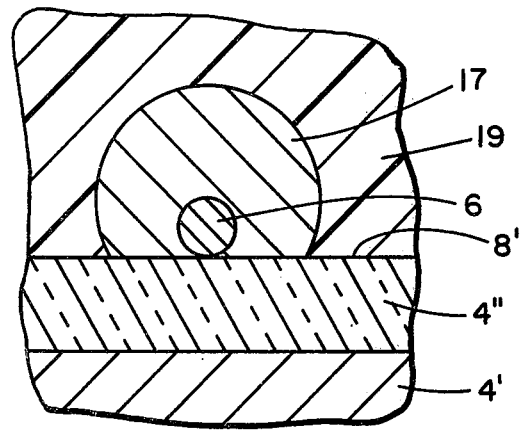
FIG. 15A is a sectional view through the portion of the recording head shown in FIG. 15, taken along section line 15A—15A thereof.

For reasons previously explained, the microfilm-facing end of the support 4b is encapsulated in a body 19 of an insulating potting material which acts like a good heat sinking material. This body 19 of the potting material extends relatively closely to but is spaced from the bent-back portions of the heating wire threads 6 which extend beyond the neck portion 4a of the support body. This spacing should be at least about 10-20 micron (about a 20 micron spacing being preferred) so that it does not hinder good heat transfer to the microfilm, yet aids in quickly cooling the heating wire threads as soon as flow of current terminates therein. The encapsulating body 19 preferably has a flat film-engaging area 19a surrounding the tip of the projecting neck portion 4a of the support body 4 and in a plane to be parallel to the microfilm to be imaged. This plane may be slightly above or behind the tip of the support body 4 to give the desired spacing thereof from the thread 6. Preferably, the encapsulating body 19 terminates in the plane of the support body tip, with the desired spacing being achieved by cutting away part of the body 19, as shown at 19'—19' in FIG. 13.

The reading of alpha-numeric characters on a projection screen is facilitated by high resolution obtained by the small dot images produced on the recording medium involved. Also, the clearest projected images are obtained by projecting light through the recording medium in comparison to viewing light reflected from the surface thereof. For this reason, it is most advantageous that the heat-responsive recording media used in the alpha-numeric data recording applications of the invention be a microfilm producing a pattern of transparent and opaque images, so that light can be projected through the transparent portions thereof. To this end, and referring now more particularly to FIG. 17A, the heat-responsive recording medium used to make the microfilm 21 there shown, advantageously may comprise a solid substrate 22 of a transparent synthetic plastic material which may be polyesters, particularly polyethylene terephthalates, like Mylar, which has a melting temperature of about 250° C. Upon one side of the substrate is deposited a thin film 23 of heat-responsive imaging material of the kind which is initially opaque or transparent (but preferably initially opaque) and becomes transparent or opaque when heat above a given predetermined value is fed thereto or developed therein. There is preferably applied to the outer surface of the imaging layer 23 a transparent protective layer 24 made of any suitable transparent synthetic polymeric material, such as polyurethane, polyvinylidine chloride or silicone resin, such as Dow Corning R-4-3117.

While the imaging layer 23 could comprise initially transparent films like unusually thin diazo-type vesicular-type, and dry silver-type film modified to be insensitive to light and highly sensitive to heat, or other heat-responsive initially transparent films well known in the art, like the chalcogenide glass semiconductor compositions disclosed in U.S. Pat. No. 3,530,441, granted Sept. 22, 1970, it most advantageously is of the form disclosed in application Ser. No. 725,926, filed Sept. 23, 1976. Such an imaging layer has the capacity of dispersing by forming small globules or other small particles or small structures on a given substrate. The dispersion imaging materials include metals as well as electrical semiconductors (i.e. materials having an electrical conductivity of from $10^{-13}$ to $10^3$ $ohm^{-1} cm^{-1}$) and electric nonconductors such as various organic compounds. It was found that particularly useful are metals having a relatively low melting point, such as bismuth or the like, preferably a bismuth alloy which melts at a temperature no greater than about 150°-250° C. Among the class of semiconductor materials some are more brittle than metals. This brittleness can in some cases favor dispersion. Most preferred among these semiconductor materials is tellurium.

Since it takes a finite time for a heated current-carrying thread 6 of the recording head 2 to cool after it is initially heated by Joule heating, the maximum scanning speeds and best resolution is generally achieved by minimizing the temperature at which the current-carrying points of the heating heads is to be raised to produce imaging in the recording medium. Also, when the recording medium includes, in addition to an imaging layer, a substrate like substrate 22 and a protective layer like layer 24 as shown in FIG. 17A, it is desirable that the softening or flow temperatures of the substrate and protective layers are higher than the temperature to which the imaging layer 23 must be raised to obtain effective imaging. If, for example, the imaging layer, must be raised to a temperature, for example, of 300° C. to produce effective imaging, the aforementioned polyester substrate material which has a melting temperature of about 250° C. would be less desirable. In such case, for example, the substrate could be a higher melting point material like the polyimide Kapton, sold by the Dupont Corporation, which has a zero strength temperature of about 815° C. In any event, the preferable imaging layer material is one having a low melting point like bismuth or bismuth alloys of the type to be described.

Another desirable property of the dispersion imaging material is that it has at or above its melting or softening point and at the imaging temperature reached a viscosity which is low enough to permit its flowing together into small droplets, globules or similar structures or at least its thinning out sufficiently to form selected transmissive areas. At the same time the material should preferably also have a relatively high surface tension, when it is in the molten or softened state, to promote droplet or globule formation. Furthermore, a particular selected dispersion imaging material must also have a low wettability for the particular substrate, whereon it is to be used. If the wettability of the dispersion imaging material for its substrate is too large, insufficient dispersion and poor images may result.

Of great importance is that the dispersion imaging material in its undispersed state is highly opaque. If it does not have the required high opacity in its deposited film state, as is the case in some of the otherwise suitable organic and inorganic materials, opacity may be produced by adding organic dyes or very finely particulate pigment materials such as carbon black and the like.

Images produced by the imaging materials referred to have as high a resolution and as good a definition as can be produced by the use of a suitable highly opaque dispersion imaging material, the images show high contrast even at minimal thicknesses of the film of dispersion imaging material, such as thicknesses of 0.2 micron and less.

Generally, materials which have melting or softening points in the range from about 50° C. to about 500° C., but preferably no higher than about 250° C., a viscosity at or above the melting or softening point in the range from about $10^{-2}$ poises to about $10^5$ poises, a thermal conductivity of from $$10^{-4} \frac{cal \cdot cm}{cm^2 \cdot s \cdot deg \cdot C.} \text{ to } 10^{-1} \frac{cal \cdot cm}{cm^2 \cdot s \cdot deg \cdot C.}$$

and a surface tension in the softened or molten state of from 50 to 1000 dyns/cm are generally suitable dispersion imaging materials for use as the imaging layer 23.

The layer or film of dispersion imaging material may be provided on the substrate of any convenient means, for instance by thermal evaporation and deposition in vacuum, by sputtering, by application in the form of a solution with subsequent evaporation of the solvent and so forth.

In a high contrast film application where gray scale is not needed, when current is applied to the heating wireforming threads of the recording head 2 overlying the microfilm 21 to produce Joule heat above a given value, heat transmitted to the imaging layer 23 through the protective layer 24 will result in the dispersion of the imaging layer material receiving heat above this value which forms small globules 23' shown in FIG. 17B. These globules adhere to the substrate so that when the heat generated in the current-carrying point involved terminates, these globules cool and solidify. The globules have a very small size, for example, of the order of magnitude of 1 micron and less, and are spaced from each other by such a considerable relative distance that the general region effected by the current-carrying point or segment effectively appears as a single transparent point when light is transmitted therethrough. For a high contrast film, the imaging layer preferably includes bismuth combined with either or both lead and tin. For example, a composition of 60% by weight of bismuth, 20% by weight of lead and 20% by weight of tin makes a particularly desirable high contrast imaging layer. Also, other compositions that are useful is a composition of 80% by weight of bismuth, 10% by weight of lead, 10% by weight of tin, and a composition of 70% by weight of bismuth, 20% by weight of lead and 10% by weight of tin.

One exemplary process for forming an imaging layer with the above-identified compositions is to mix the desirable percentages of the different elements in a quartz tube (such as 60 grams of bismuth, 20 grams of lead and 20 grams of tin), heat the same until melting, mix by shaking, and then cast the same on a glass plate. The resultant mixture is then pulverized in a mortar and 25 grams of pulverized material is placed in an evaporation boat in a vacuum deposition machine where the vacuum chamber is evacuated to about $10^{-6}$ torr. The composition involved is evaporated onto the substrate involved, which may be the aforementioned polyester resin substrate extending along a water cooled substrate holder so that the substrate is relatively cool (e.g. below about 80° C.), by placing the boat approximately 4.5 inches below the substrate with a glass cylindrical 4.5 inch diameter chimney extending between the boat and the substrate, and heating the boat to vaporize the alloy composition. For best results, about 10 grams of silicon monoxide placed in a separate evaporation boat below the chimney is heated to vapor deposit the silicon monoxide upon the alloy layer. A preferable optical density range of the film, which is controlled by the amount of evaporated material, is about 1.0–2.5. The alloy layer is then coated preferably with a suitable transparent protective material, as previously described. In the alternative, if a special formating of the recording medium is desired, such as when it is desired to form a microfiche card where the areas thereof surrounding each initially opaque frame are to be initially transparent, a photo-resist coating sensitive to ultraviolet light or the like is applied as the protective coating. (This photo-resist coating may be the KPR-4 photo-resist manufactured by Eastman Kodak Company, which is a polyvinylcinnamate.) The coating is then subjected to ultraviolet light passed through a mask in those areas in which it is desired the opaque film to remain (such as the frame-forming areas of the microfiche card 5) and the other areas of the film are then etched away by suitable processing chemicals. The area of the photo-resist struck by the ultraviolet light are unaffected by the etchant. If it is not desired to etch away any part of the opaque film, then the other aforementioned protective coatings are preferred.

Figure 16:
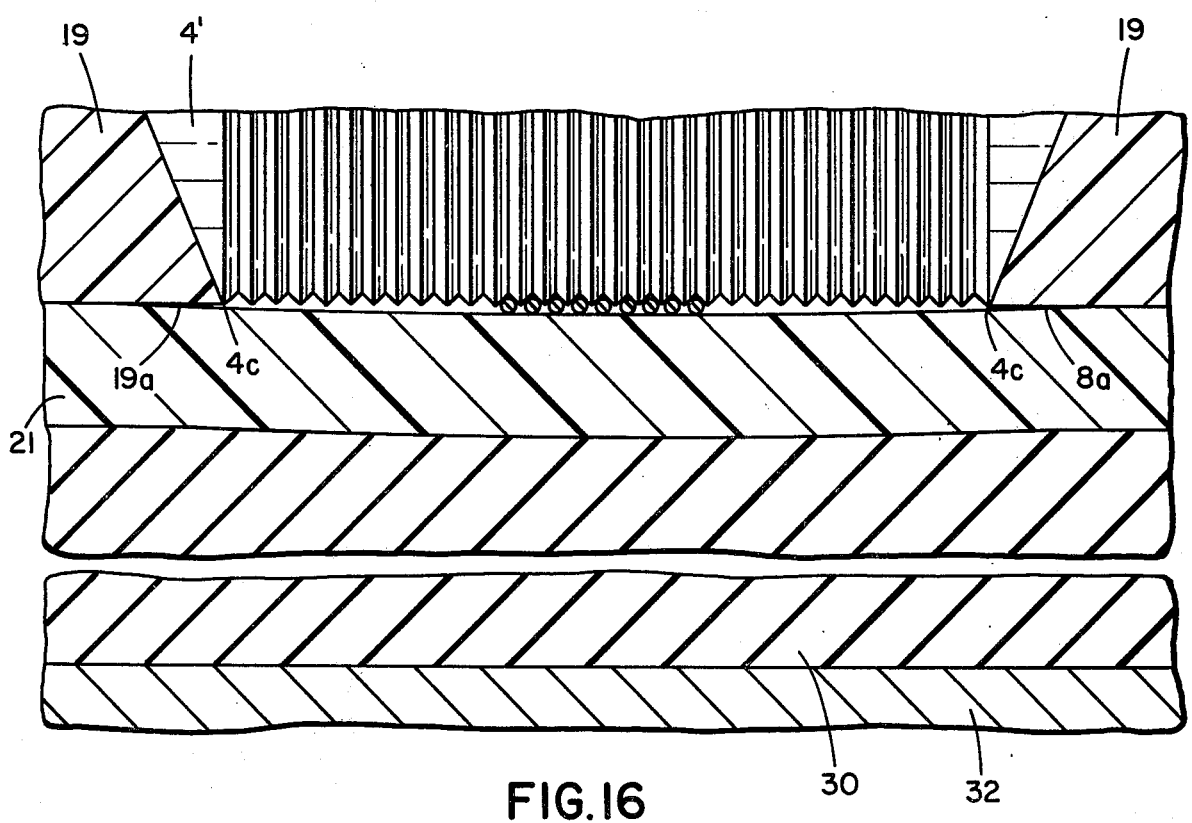
FIG. 16 is a greatly magnified fragmentary vertical sectional view through the bottom end portion of the recording head shown in FIG. 1, when the recording head is in contact with a microfilm backed by a layer of cushioning material.

As previously indicated, for maximum recording speed, the heating wire-forming threads 6 of the recording head 2 remain in contact with the surface of the microfilm during a recording operation, so that the threads make sliding engagement with the microfilm surface. This raises a serious risk of scratching the surface of the film. Whether or not the protective layer 24 of the microfilm 21 is penetrated during the scratching of the film, a projected image of the microfilm 19 which has been scratched can produce sufficient scratch-lines in the projected image as to seriously impair the ability of the projected image. It was also discovered that visible scratching of the film can be eliminated by supporting the microfilm on a resilient backing layer 30 shown in FIG. 16 supported on a rigid metal wall 32. For example, this backing layer may be a polyurethene foam material having a linear compressability of about 0.1 g/mm$^3$ and a thickness of about 6 mm. Where the microfilm is a microfiche card, the entire microfiche card is supported upon such a resilient layer 30. In such case, when the recording head is lowered into position upon the microfilm 21, the pressure of the heating wire-forming threads 6 projecting from the recordhead will deflect the film 21 as shown in FIG. 16, so that the friction between the threads 6 and the microfilm surface is materially reduced, as compared to the case where the microfilm rests on a hard unyielding surface. Additionally, it was found that the microfilm surface bowed sufficiently in the regions contacted by the threads 6 that the microfilm made no contact with the neck portion 4a of the support body. Thus, as shown in FIG. 16, the microfilm 21 makes initial contact with the recording head at a point of the encapsulating body surface 19a spaced somewhat from the sharp edges 4c—4c of the neck portion. While the edges of 4c—4c of the neck portion 4a are shown covered or protected by the encapsulating body 19, which is shown flush with the bottommost surface of the neck portion 4a, tolerances in the manufacture of the recording head can be less severe if contact between the microfilm 21 with the neck portion 4a can be avoided.

While the provision of a resilient backing layer 30 for the microfilm 21 substantially eliminates a scratching problem, it is important that the resilient backing layer 30 be sufficiently unyielding or rigid as to assure substantially even contact between the heating wire-forming threads 6 and the microfilm surface. Thus, excessive softness or resiliency of the layer 30 can cause uneven or erratic contact between the threads 6 and the microfilm surface and make the orientation of the recording head more critical.

While it is possible that the recording head 2 may be held stationary and the microfilm is moved relative thereto, it is preferred that the recording head 2 be moved relative to a stationary microfilm. Refer now more particularly to FIGS. 19 through 22, which illustrate a preferred support structure for the microfilm 21 (in the form of a microfiche card) and recording head 2. This support structure shown within a housing 28 includes a microfiche card-receiving slot 33 into which the microfiche card 21 may be inserted. The microfiche card 21 is seated over positioning pins like pin 34 and rest on the resilient backing support or pad 30 of polyurethane foam seated on a metal wall 32, both forming part of a microfiche card support frame 36. The housing 28 contains apparatus for automatic stepping motor controlled positioning of the microfiche card support frame 36 and a carriage 37 therefor, and a control panel (not shown) may be provided including frame positioning controls which when operated move the carriage 37 and frame 36 to bring a selected frame of the microfiche card 21 opposite a recording station. (These frames shown in FIG. 19 are identified by row letters B-H and column numbers 1-14.)

The microfiche card support frame 36 is supported for movement in a Y axis direction by means including a screw 38 threading through laterally projecting arms 42–43 and a guide rod 40 slidably passing through an opening in arms 44–46 of the frame 36. The screw 38 is rotatably supported in upwardly extending, bearing-forming projections 54–56 and the rod 40 extends rigidly between projections 58–60 formed integrally with the carriage 37. The screw 38 is coupled by a gear 64 to a screw 66 supported for rotation in bearings (not shown) on the carriage 37. A stepping motor (not shown) may be provided to rotate an incremental angle for each pulse fed thereto to advance the screw 66, gear 64 and screw 38 coupled thereto to move the microfiche card support frame 36 a corresponding incremental distance in the Y axis direction.

The carriage 37 is supported for movement along the X axis direction by means including a screw 76 threaded into the base 37a of the carriage at the rear end thereof and extending between a stationary bearing 78 secured to the housing 28 and another stationary bearing (not shown). A slide rod 80 slidably passes through an opening in the base portion 37a of the carriage 37 at the front thereof. The screw 76 may be driven by a stepping motor (not shown) supported on a housing wall. The stepping motors referred to receive pulses fed to either forward or reverse drive inputs thereof for rotating the associated screws 66 and 76 in one direction or the other, to effect movement of the microfiche card support frame 36 in one direction or the other along the Y axis and X axis directions. The microfiche support frame 36 is thus movable in the Y and X axis directions to bring any selected frame of the microfiche card opposite a recording station 77 located at the intersection of a vertical reference axis A1 and a horizontal reference axis A2.

To provide the operator an indication of the position of the carriage 37 and the frame 36, the Y axis control screw 66 and the X axis control screw 76 may be provided with gears (not shown) coupled to an indicator unit on the control panel referred to which displays indicia which signify when the carriage 37 and frame 36 are in position for loading or recording, and also letter and number indicia which identify the particular microfiche frame which is positioned at any given time at the recording station 77.

Supported at a point immediately above the recording station 77 at the intersection of axes A1 and A2 is a recording head housing 89. Refer now more particularly to FIGS. 20–22 for a description of the same. As there shown, the recording head housing 89 has an upper wall 89a. Rotatably mounted in bearings supported on the front and rear walls 89b and 89c of the housing 89 is a screw 98 preferably of a special type referred to as a "variable pitch screw", the screw 98 being driven by a stepping motor 100. The screw 98 carries a frame structure 102 which, among other things, carries the recording head 2. The frame structure 102 has an upper sleeve-forming portion 102a with a longitudinal passageway 103, the defining walls of which make a sliding fit over the exterior surface of the screw 98. The screw 98 has a continuously spiralling groove 104 which has equally spaced axially extending portions 104a and straight portions 104b which extend transversely only of the longitudinal axis of the screw 98. The axial distance between successive spaced portions 104b is equal to one line space of the data to be recorded on a microfiche card frame, such as 0.008 inches. A follower pin 106 anchored to the sleeve 102a of the frame structure 102 is in a mid-region of a straight groove portion 104b at the beginning of a line scan operation of the recording head. During the period the pin 106 is in a straight groove portion 104b, the recording head 2 will be scanning in an X axis direction to cross a full line of the microfiche card frame involved. The pin 106 will then enter a portion 104a of the groove 104 which has an axial component of direction, which then advances the frame structure 102 until the pin 106 enters the next straight groove portion 104b where it remains in such straight groove portion until the completion of another line scanning operation as just described.

The frame structure 102 has a pair of spaced guide-forming walls 102a–102b between which is slidably mounted a slide member 108. The slide member 108 has an upper portion 108a having a passageway 109 through which passes a grooved shaft 116 driven by electric motor 114. The shaft 116 has a groove 118 which has a portion 118a which spirals progressively, for example, over an arc encompassing 270 degrees of the circumferance of the shaft 116 and a return portion 118b extending 90 degrees around the shaft which returns to the beginning of the groove portion 118a. A follower pin 120 carried by the slide member 108 extends into the groove 118 so that continued rotation of the shaft 116 will continuously reciprocate the slide member 108 back and forth. During the first 270 degrees of rotation, the slide member 108 reciprocates at a relatively slow speed in comparison to its speed of return movement during the subsequent 90 degrees of rotation of the shaft 116 as the pin 120 rides within the return groove portion 118b.

The shaft 116 extends into a photocell control signal generating unit 121 which generates synchronizing pulses and control signals used to synchronize the feeding of current pulses to the recording head 2 and the removal of the recording head 2 from contact with the microfiche card.

The slide structure 108 has front and rear spaced walls, 108a being one of these walls between which is mounted a recording head carrying assembly 110 having the recording head 2 supported on a carrier plate (not shown). The carrier plate is carried by a solenoid (not shown). When the solenoid associated with the carrier plate is de-energized, the recording head 2 in its maximum downwardly spaced position where it is pressed against the surface of the microfiche card 35. When the solenoid is energized, it withdrawns the carrier plate carrying the recording head 2, so that the recording head is removed from contact with the microfiche card.

As previously indicated, the micro-sized heating head 6 moves at its maximum speed when the pin 120 is in the portion 118b of the slot 118 in shaft 116. To minimize wear of the microfiche card it is desirable to remove the recording head 2 from contact with the microfiche card during this very high speed of movement of the same to the beginning of a line position.

To simplify programming of the electrical controls, position signals may be generated by movement of the recording head. For example, limit switch means LS1 and LS2 may be provided on the front and rear housing walls 89b and 89c which generate a signal when the head carrying frame structure reaches its outer limits to initiate a reversal in the direction of rotation of motor 100.

With the recording head 2 described which utilizes 7 projecting heating wire-forming threads 6 for forming a vertical segment of only a single alpha-numeric character each time the recording head is energized by a pattern of current pulses, the recording head must scan the frame of the microfilm involved on a line-by-line basis to complete the recording of one page of microfilm recorded data. The time for completing a recording of a single page of data is thus determined by the speed with which the recording head 2 is moved and the number of lines which must be scanned thereby. While the complexity of the recording head 2 is increased thereby, the time it takes to record a single page of data can be materially reduced if the recording head 2 carries such a large number of heating wire-forming threads that these wires scan an entire frame of the microfilm involved. For this purpose, the recording head would carry about 2,000 heating wire-forming threads. FIG. 18 illustrates a fragmentary side elevational view of the microfilm contacting end of such a recording head showing part of the 2,000 heating wire-forming threads projecting therefrom.

The present invention has provided an easy to manufacture heat-producing recording head capable of forming micro-sized and spaced dot images which can, for example, provide clear microfilm, preferably projectable images. Also, because of the design of the recording head and the provision of a resilient support for the film, the recording operation can be carried out at substantial speeds and without scratching the film.

It should be understood that numerous modifications may be made in the most preferred forms of the invention described without deviating from the broader aspects thereof.

I claim:

1. A recording head to image selected micro-sized points of heat imageable recording material, said recording head including a heating wire support body having a heating wire-presenting end portion to face said recording material, said end portion of said support body having spaced recesses extending transversely across said end portion to form positioning grooves for fine threads of heating wire material, said support body recesses having outwardly facing edges at the bottom thereof which are to face said recording material, respective insulated fine threads of transversely extending, heating wire material extending along opposite sides of said support body and extending into said recesses, said threads of heating wire material being bent around said edges of the recesses to form micro-sized heat application points to be applied to said recording material.

2. A recording head of claim 1 wherein said fine threads of heating wire material mounted along at least one of the faces of said support body diverge outwardly progressively with respect to one another in a direction away from the recording material facing end portion of the support body.

3. The recording head of claim 1 wherein said recording material facing end portion of said support body with the fine threads of heating wire supported thereon is at least partially encased in a body of heat sinking material which extends contiguous to but is spaced from the portions of said threads of heating wire material bent around said support body edges to reduce the cooling time of the threads of heating wire material.

4. The recording head of claim 3 wherein said encasing body of heat sinking material terminates in a film backing means, said film backing means being contiguous to but spaced from said heat application points of said threads of heating wire material.

5. The recording head of claim 1 wherein said fine threads of heating wire material, except at and in the vicinity of the points where they bend around said support body edges, are electrically shunted by a low resistance material so that appreciable current flow in said threads occurs only thereat.

6. The recording head of claim 1 wherein said edges around which said threads of heating wire material are bent are formed by a first surface oriented to extend substantially at right angles to the recording material to which the recording head is to be applied and a second surface extending at an acute angle thereto so that the threads of heating wire material become crimped at the crotches of the bends therein, the cross-sectional area of the threads being reduced thereat to increase the resistance of the threads thereat and to concentrate the heat produced by current flow therethrough at these crotch points.

7. The recording head of claim 1 wherein said edges formed at the ends of said recesses or notches are formed at the intersection of support body surfaces making an acute angle no greater than about 45°, so that the threads of heating wire material are crimped at these edges to a point where the cross-sectional area thereof is materially reduced to increase the resistance and heat generated thereat and to concentrate the heat produced by current flow therethrough at these crotch points.

8. A recording head to image selected micro-sized points of a heat imageable recording material, said recording head including a heating wire support body having a heating wire-presenting end portion to face said recording material, said end portion of said support body having edge portions therealong, respective insulated fine threads of heating wire material extending transversely across and following closely the contours of said edge portions of said support body to form micro-sized image dot-forming points thereat, means for holding said fine threads of heating wire material in closely spaced contiguous relation along said edge portions of said support body, the spacing between the center points of said fine threads of heating wire material being no greater than about 1½ times the diameter thereof.

9. The recording head of claim 8 wherein said fine threads of heating wire material each have a diameter no greater than about 20 micron.

10. The recording head of claim 8 in combination with and supported in imaging relation to said recording material comprising a substantially transparent substrate, a solid, high optical density and substantially opaque film of a dispersion imaging material deposited on said substrate, said substantially opaque film of the dispersion imaging material upon application thereto of an energized one of said threads of heating wire material changing to a substantially fluid state in which the surface tension of the material acts to cause the substantially opaque film to disperse and change to a discontinuous film comprising openings and deformed material which are frozen in place following said application of heat energy and through which openings light can pass.

11. A recording head to image selected micro-sized points of a heat imageable recording material, said recording head including a heating wire support body having a heating wire-presenting end portion to face said recorded material, said end portion of said support body having relatively sharp edge portions therealong, respective insulated fine threads of heating wire material extending transversely across and following closely the contours of said relatively sharp edge portions of said support body to form micro-sized image dot-forming points thereat, means for holding said fine threads of heating wire material in closely spaced contiguous relation along said end portion of said support body, said support body being made of a material which is a good conductor of heat, and said fine threads of heating wire material being encapsulated by a body of heat sink-forming material, said encapsulating material extending contiguous to the portions of the threads of heating wire material but being spaced from the outermost portions thereof which are to contact said recording material.

12. The recording head of claim 11 wherein said encapsulating heat sink-forming material terminates short of said image dot-forming points of said threads of heating wire material by at least a distance no greater than about 20 micron.

13. The recording head of claim 11 wherein said body of encapsulating heat sink-forming material provides a film engaging means which extends close to said dot-image forming points of said threads of heating wire material to prevent excessive bowing of the film therebeyond.

14. A recording head to image selected micro-sized points of a heat imageable recording material, said recording head including a heating wire support body having a heating wire-presenting end portion to face said recorded material, said end portion of said support body having edge portions therealong, respective insulated fine threads of heating wire material extending transversely across and following closely the contours of said edge portions of said support body to form micro-sized image dot-forming points thereat, means for holding said fine threads of heating wire material in closely spaced continuous relation along said end portion of said support body, non-conductive adhesive means anchoring said threads of heating wire material to said support body at said points contiguous to said image dot-forming points thereof, said threads of heating wire material on at least one side of said support body diverging sharply outwardly at the points where said non-conductive adhesive means terminates and extending to relatively widely spaced current-applying terminal-forming points, respective conductors many times greater in cross-section than said threads of heating wire material electrically connected to said terminal-forming points, the threads of heating wire material on the opposite side of said support body extending to at least one terminal point, at least one conductor many times greater in cross-section than said threads of heating wire material being electrically connected to said at least one terminal point, and a highly conductive material coating the portions of said threads of heating wire material between said terminal points and the termination points of said non-conductive adhesive means.

15. A recording head to image selected micro-sized points of a heat imageable recording material, said recording head comprising a heating wire support body made of a heat sinking material, said support body having a projecting neck portion providing a thin recording material facing end portion to be positioned contiguous to said recording material, said thin end portion of the support body having longitudinally, closely spaced, transversely extending notches therein which form wire-positioning recesses for fine threads of heating wire material, said notches being spaced less than about twice the diameter of said fine threads of heating wire to be received therein and terminating in respective aligned edges to face said recording material, fine threads of transversely extending heating wire material respectively bent around said aligned edges to extend along opposite faces of said support body, said fine threads of heating wire being substantially thicker than the depth of said notches so as to project substantially beyond said support body so they form micro-sized dot image-forming points which may contact said recording material at points spaced from the heat sinking material of the support body, said fine threads of heating wire material along at least one of the faces of said support body diverging outwardly progressively in a direction away from the recording material facing end portions of the support body and extending to relatively widely spaced current-feeding terminal points, said fine threads of heating wire material at points spaced from the points where they bend around said aligned edges being encased in and electrically shunted by a low resistance material so that appreciable current flows therein only at or near said dot image-forming points, at least said neck portion of said support body with fine threads of heating wire material supported thereon being encapsulated in a body of said sink-forming material which extends contiguous to but spaced from the portion of said support body neck portion where said threads of heating wire material bend around said aligned edges thereof.

16. The recording head of claim 15 wherein said fine threads of heating wire material are anchored to said support body with a non-conductive cement in a band between said recording material facing edges of said support body and the points contiguous thereto where said fine threads of heating wire are encased by said low resistance material.

17. The recording head of claim 15 wherein said body of encapsulating heat sink-forming material provides a film engaging means which extends close to said dot-image forming points of said threads of heating wire material to prevent bowing of the film therebeyond.

18. In a recording system for producing microform records and including a source of electrical signals presenting information to be recorded, a recording head responsive to said signals and having one at least current-carrying point for producing a Joule heating of adjacent recording material when recording current flows therein, each current-carrying point being individually selectively energizable with current, film support means confronting said recording head, means for supporting said recording head in a position where each current-carrying point thereof contact the film supported against said support means, and means for moving one of said recording head and film support means relative to the other so that the film is slideably engaged by the recording head and scanned by said current-carrying points of said recording head as said source of electrical signals intermittently feeds current pulses through selected ones of said current-carrying points, the improvement wherein said support means forms a resilient backing for the side of the film opposite to that engaged by the recording head to reduce the abrasion forces between the recording head and film.

19. The recording system of claim 18 wherein said support means is sufficiently rigid to avoid substantial bowing under the pressure of the recording head which causes uneven contact between the current-carrying points of the recording head and the film.

20. The recording system of claim 19 wherein said recording head comprises a heating wire support body having a heating wire-presenting end portion to face said recording material, said end portion of said support body having edge portions therealong, respective insulated fine threads of heating wire material projecting from and extending transversely across and following closely the contours of said edge portions of said support body to form micro-sized image dot-forming current-carrying points thereat, means for holding said fine threads of heating wire material in closely spaced contiguous relation along said edge portion of said support body.

21. The recording head of claim 8 in combination with and supported in imaging relation to said recording material comprising a dry process microform film including a substrate, a thin layer of imaging material comprising a coating upon one side of said substrate, said threads of heater wire material being opposite said layer of imaging material, and the thickness of the film from the side thereof adjacent to said threads of heating wire material to the adjacent interface of said coating of imaging material and substrate being no greater than about 2 micron.

22. The combination of claim 21 wherein said film other than said imaging layer being transparent, said layer of imaging material is initially opaque and upon application of the Joule heating of said imaging layer by a thread of heating wire material, the portion of said imaging layer opposite the same being transformed into a substantially transparent portion.

* * * * *